United States Patent [19]

Hunte

[11] Patent Number: 4,937,499
[45] Date of Patent: Jun. 26, 1990

[54] PHOTOSENSITIVE ILLUMINATING DISPLAY

[76] Inventor: Herbert H. Hunte, 67 Ardill Crescent, Aurora, Ontario, Canada, L4G 3G9

[21] Appl. No.: 171,705

[22] Filed: Mar. 22, 1988

Related U.S. Application Data

[63] Continuation of Ser. No. 909,931, Sep. 22, 1986, which is a continuation-in-part of Ser. No. 841,508, Mar. 19, 1986, abandoned.

[51] Int. Cl.$^5$ ...................... H05B 37/02; G09F 13/04
[52] U.S. Cl. ........................................ 315/149; 40/568
[58] Field of Search .................. 315/149, 159; 40/542, 40/564, 565, 566, 567, 568, 578, 573, 576, 575, 579, 580

[56] References Cited

U.S. PATENT DOCUMENTS

| | | | |
|---|---|---|---|
| 2,893,148 | 7/1959 | Figman | 40/576 |
| 3,361,931 | 1/1968 | Vollrath | 315/158 |
| 3,414,999 | 12/1968 | Mason | 40/576 |
| 3,421,005 | 7/1969 | Baker | 250/206 |
| 3,421,013 | 7/1969 | Angelari | 250/239 |
| 3,584,257 | 8/1971 | Adams | 315/205 |
| 3,961,183 | 1/1976 | Dubot et al. | 250/214 R |
| 4,087,722 | 5/1978 | Hancock | 315/200 A |
| 4,114,299 | 9/1978 | Brownlee | 40/545 |
| 4,139,802 | 2/1979 | Lemercier | 315/151 |
| 4,267,657 | 5/1981 | Kloke | 40/549 |
| 4,373,284 | 2/1983 | Crane | 40/576 |
| 4,410,930 | 10/1983 | Yachabach | 362/145 |
| 4,441,143 | 4/1984 | Richardson | 362/183 |
| 4,587,753 | 5/1986 | Harper | 40/580 X |
| 4,658,129 | 4/1987 | Jenn-Kang Fan | 250/214 R |
| 4,765,080 | 8/1988 | Conti | 40/576 |

Primary Examiner—David Mis
Attorney, Agent, or Firm—McCarthy Tétrault

[57] ABSTRACT

An illuminated house sign is described which switches on and off in response to ambient light conditions. A photocell senses the ambient light and controls the supply of electrical power to a fluorescent tube to switch the tube on when the ambient light falls beneath a predetermined value and which switches the tube off when the ambient light exceeds the predetermined value. The control electronics are mounted within a sign housing and can be driven by domestic 115 VAC electrical supply.

13 Claims, 4 Drawing Sheets

PHOTOSENSITIVE ILLUMINATING DISPLAY

The present application is a continuation of a continuation-in-part applciation, Ser. No. 909,931 filed on Sept. 22, 1986 which is a continuation-in-part application of application, Ser. No. 841,508 filed on Mar. 19, 1986, now abandoned.

The present invention relates to an illuminated sign having a fluorescent tube as a light source and particularly, but not exclusively, the invention relates to illuminated signs for identifying house addresses and the like.

An illuminated house sign should satisfy a number of basic design criteria such as robustness, being relatively inexpensive and easy to maintain as well as being aesthetically pleasing and being capable of indoor or outdoor use. In addition, the sign should operate at a low power to minimize electrical safety hazards and the sign should be constructed to permit relatively easy access to the interior to remove or replace the light source.

Numerous illuminated house signs having fluorescent tubes have been proposed such as disclosed for example in U.S. Pat. No. 2,893,148 to Figman and U.S. Pat. No. 4,373,284 to Crane. However, these patents are principally concerned with the mechanical structure of the illuminated house number sign housing rather than the operation of the illuminated sign or control of the illumination of the fluorescent tube.

U.S. Pat. No. 4,410,930 to Yachabach and U.S. Pat. No. 4,441,143 to Richardson relate to photovoltaic lighting for an outdoor telephone booth. These patents disclose an array of solar cells on top of a remote telephone booth to provide electrical power and using this power to charge a storage battery to provide power for operation of the telephone. The patents also disclose the use of a photosensor which causes power to be applied to a fluorescent sign to illuminate the booth when dark and which causes the illumination to be switched off in daylight conditions. In the aforementioned Figman and Crane patents there is no provision for automatically controlling illumination of a house sign in response to ambient light. Consequently, the light source may be accidentally left on or off. Furthermore, the Richardson and Yachabach systems are designed for use with a remote telephone booth so that if the battery fails or is not charged, e.g., due to excessive cloud then it is possible that the battery would provide insufficient power to illuminate the sign. This system is not desirable for use with an illuminated house sign because of the cost and the possible unreliability of the system. This is relevant because illuminated signs are usually located under the eaves and consequently it is most unlikely that even if an array of solar cells were used it would not obtain sufficient power to charge a battery for subsequent use in controlling illumination of the sign in response to ambient light.

An object of the present invention is to obviate or mitigate the above-mentioned disadvantages.

According to one aspect of the present invention there is provided an illuminated house sign having a light source with means responsive to ambient light to turn said light source on and off in accordane with a pre-determined ambient light level.

In accordance with another aspect of the invention there is provided a control apparatus for supplying electrical power to an illuminated light and for controlling the supply of electrical power into said light source in accordance with ambient light so that said light source is switched between an "on" and an "off" condition in accordance with a pre-determined ambient light level.

In the preferred embodiment of the invention the light source is a fluorescent tube and a cadmium sulphide photocell is used as a photo sensor to sense ambient light. The fluorescent tube is energized by DC power rectified from AC domestic mains supply. The power to the fluorescent tube is controlled by a control circuit which includes the cadmium sulphide photo sensor which reacts to ambient light levels. The particular light level at which the fluorescent tube is designed to switch on and off can be pre-selected and pre-set during manufacture. The control circuitry is located on a printed circuit board mounted in the illuminated sign housing so as to require minimal space.

These and other embodiments of the invention will be described with reference to the accompanying drawings in which.

Figure 1:
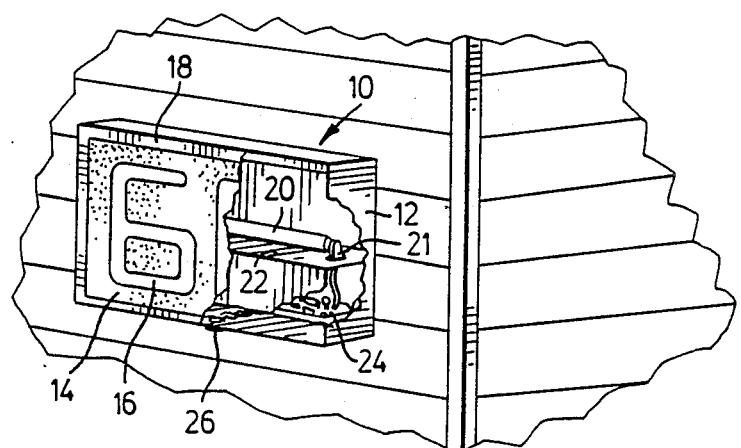
FIG. 1 is a perspective or partly broken away view of an illuminated house sign in accordance with a preferred embodiment of the invention.

Reference is now made to FIG. 1 of the drawings which shows an illuminated house sign generally indicated by reference numeral 10 mounted on the wall of a house. The house sign consists of a generally box-like rectangular housing 12 and a front display panel 14 which is generally translucent and which has indicia 16 thereon adapted to be illuminated when the display is switched on. The display panel 14 is fastened to cover the front face of the housing by a trim strip 18 and which forms a border around the housing 12. A 9 inch mini-fluorescent tube 20 is located between tube contacts 21 (one of which is shown) mounted on a bracket 22. The contacts 21 are electrically connected to a control circuit board 24 which controls the supply of electrical power from the mains to the fluorescent tube under the control of a photocell 26 located in the base of the housing 12 as will be explained.

Figure 2:
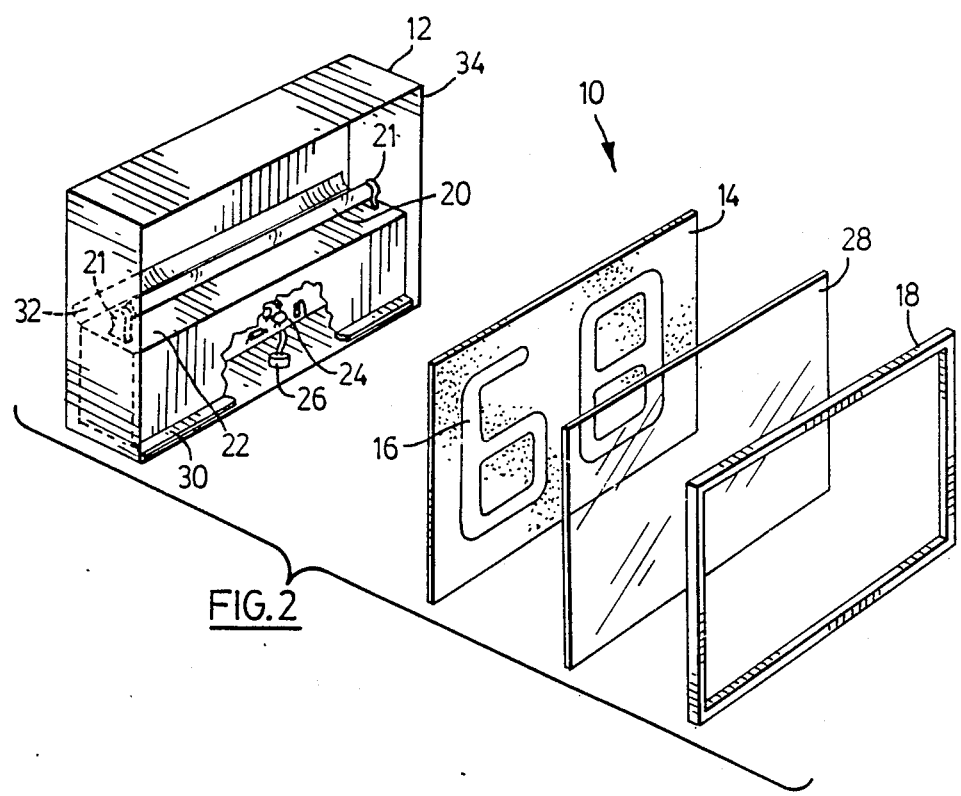
FIG. 2 is an exploded view of part of the house sign which is shown assembled in FIG. 1

Reference is now made to FIG. 2 and it will be seen that the display panel 14 has a covering panel 28 of Lexan (trade mark) polycarbonate material for protecting the panel from the elements and from accidental damage. The display panel 14 comprises a generally dark background (shown dot-shaded) with translucent unshaded portions identified as numerals six (6) and eight (8). This panel is made by firstly providing a sheet of a translucent material, masking the numbers six (6) and eight (8), spraying the panel with paint and then removing the mask to leave translucent numbers six and eight so that when the fluorescent tube 20 is illuminated the numerals light up. Alternatively a silk screen can be used to form the numerals to achieve the same effect.

The fluorescent tube 20 conveniently fits between contacts 21 which are supported atop a generally horizontal surface of the bracket 22. The bracket has projecting strips 30 and 32 which are adapted to be fastened to the base and back wall respectively of the rectangular housing 12. The photocell 26 is shown projecting through the base of the housing so that it is responsive to ambient light only and to limit its exposure to illumination from the sign itself, street lighting or any other non-ambient light source. The display panel 14 and the Lexan (trade mark) panel 28 are dimensioned to fit within a rectangular border 34 on the front of the housing. The trim 18 is dimensioned to fit over these panels and to be fastened to the box frame by four screws (not shown) to retain the panels 14 and 28 to the frame securely. At the same time the trim can be released relatively straight forwardly so that the panel and/or the fluorescent tube can be easily replaced.

Figure 3:
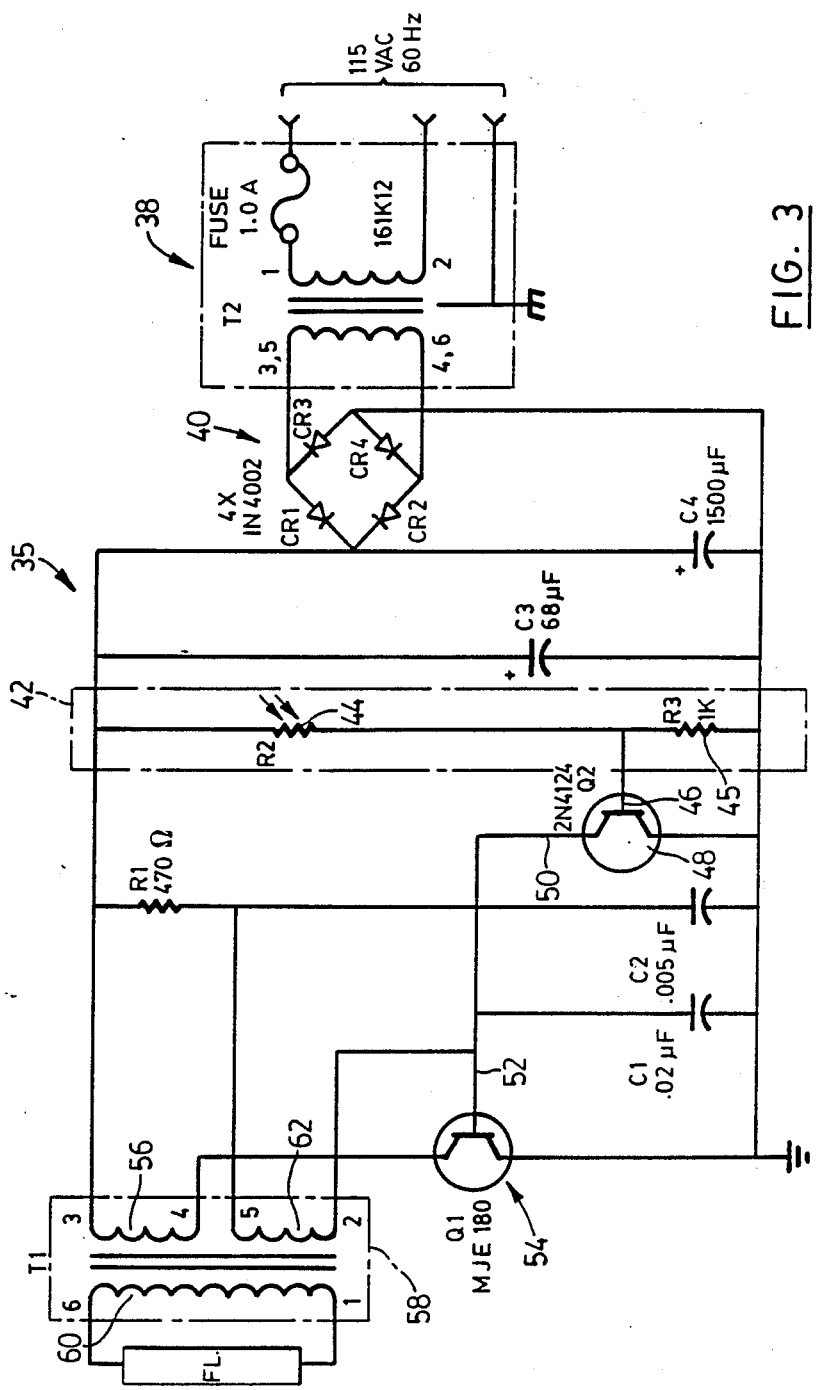
FIG. 3 is a circuit diagram of a preferred control circuit used to control illumination of the illuminated display shown in FIGS. 1 and 2.

Reference will now be made to FIG. 3 of the drawings which is the control circuit adapted to provide power to the fluorescent tube from an electrical 115 VAC domestic mains supply at 60 hertz under the control of the photocell 26. The control circuit is generally indicated by reference numeral 35 and is mounted on the circuit board 24 shown in FIGS. 1 and 2. The circuit is connected by conductors to a domestic 115 VAC 60 hertz power supply. The 115 VAC supply is passed through a step-down transformer 38 to provide a low current, and the alternating voltage from the transformer secondary winding is rectified by a full bridge rectifier 40 to produce a positive DC signal. The rectified signal is smoothed by smoothing capacitors C3 and C4 having the values of 68 microfarads and 1500 microfarads respectively. The smoothed and rectified positive DC signal is supplied across a potential divider generally indicated by reference numeral 42.

The potential divider 42 consists of the resistance 44 of a cadmium sulphide photocell 26 and a 1k ohm resistance (R3) 45 connected in series. Between the two resistors 44 and 45 a tap is taken to the base 46 of a transistor 48. The potential across resistor 45 is given by $$V_{R45} = V_{dc} \frac{R_{45}}{R_{45} + R_{44}}$$

The resistance 44 of the cadmium sulphide photocell 26 is light dependent, i.e., it normally has a high resistance at low ambient light levels and the resistance falls reasonably linearly with increasing ambient light. Accordingly, in the absence of a high ambient light level the resistance of the photocell is very high and this limits the current flowing through resistors R2 R3 so that the potential drop across resistance 45 is insufficient to turn transistor 48 on. As the ambient light level increases the resistance 44 decreases to a level at which the potential across resistor R3 increases such that the transistor 48 is turned on and an output signal is obtained from the collector 50 of the transistor.

The collector output is connected to the base 52 of a driver transistor 54. The transistor 54 is turned on and provides an output signal to a primary winding 56 of a transformer 58 and induces feedback in the feedback winding 62 thus causing the circuit to oscillate. The frequency of oscillation is determined by resistor R1 (410k ohm) and capacitor C2 (0.005 F). The resultant AC voltage in the secondary winding 60 causes the fluorescent tube to turn on. This type of driver circuitry is generally standard in the art. This results in efficient and better stable operation and flicker is almost eliminated.

When the ambient light level falls the resistance of the cadmium sulphide photocell 26 increases and pulls the voltage at the base 46 down so that transistor 48 and transistor 52 is switched off resulting in the fluorescent tube becoming extinguished.

Thus it can be seen that the fluorescent tube is illuminated at a predetermined ambient light level. Hence there is economical use of power and no requirement for the user to continually have to switch the illuminated sign on and off. Because of fluorescent tube is used, the power required to operate the display is minimal and such 9 inch mini-fluorescent tubes typically have a power rating of 6 watts. Also the voltage required to drive the fluorescent tube circuit is very small i.e., about 7.5 volts with a correspondingly small current so that not only is the electrical power consumption reduced, but the apparatus is electrically less hazardous. The housing 12 may be connected to the earth conductor in the domestic mains system for added safety although it will be appreciated that the housing conductor could be electrically double insulated to achieve similar electrical isolation.

Furthermore the bracket used on the housing to separate the circuit board from the fluorescent tube is also used to provide a support for the fluorescent tube and to make it relatively easy to remove and replace a fluorescent tube as desired. It will be appreciated that various modifications may be made to the apparatus and circuit as hereinbefore described without departing from the scope of the invention. For example, it will be appreciated that the circuitry need not be applied to an illuminated house light but to any fluorescent light which requires to be switched on in response to changing ambient light conditions such as neon signs for shops and the like. Also the circuitry could be controlled by use of a second ambient light sensor in parallel with the first sensor so that at dusk and at dawn the fluorescent lights would come on but would switch off during the night in very dark conditions and off during the day in very light conditions. The cadmium sulphide photocell could be replaced by any other suitable light sensitive device. The type of display panel and housing structure need not be exactly as described in the preferred embodiment but it will be appreciated that various different shapes and structures could be used to incorporate the features of the invention disclosed and described in the preferred embodiment. In addition, all the component values are exemplary and it will be appreciated that these could be replaced by other preselected values designed to give the afore-described response to changing ambient light levels.

Figure 4:
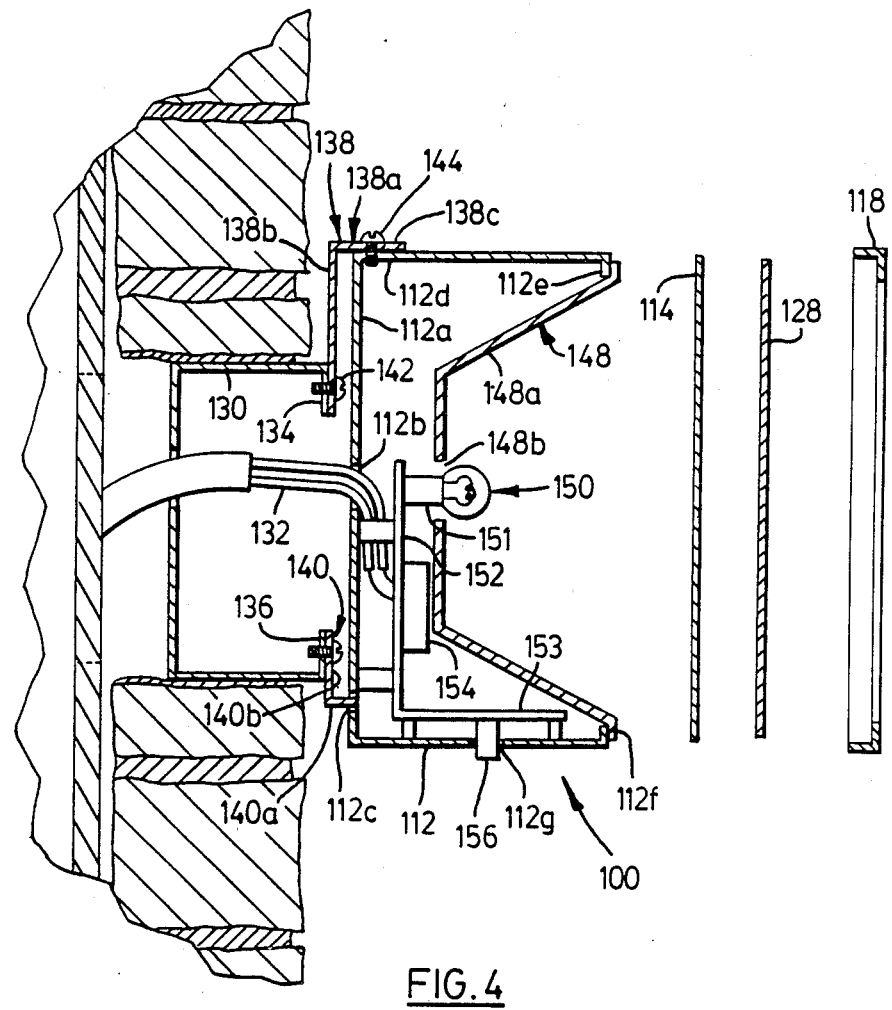
FIG. 4 is a partly exploded cross-sectional view of an alternative illuminated house sign.
Figure 5:
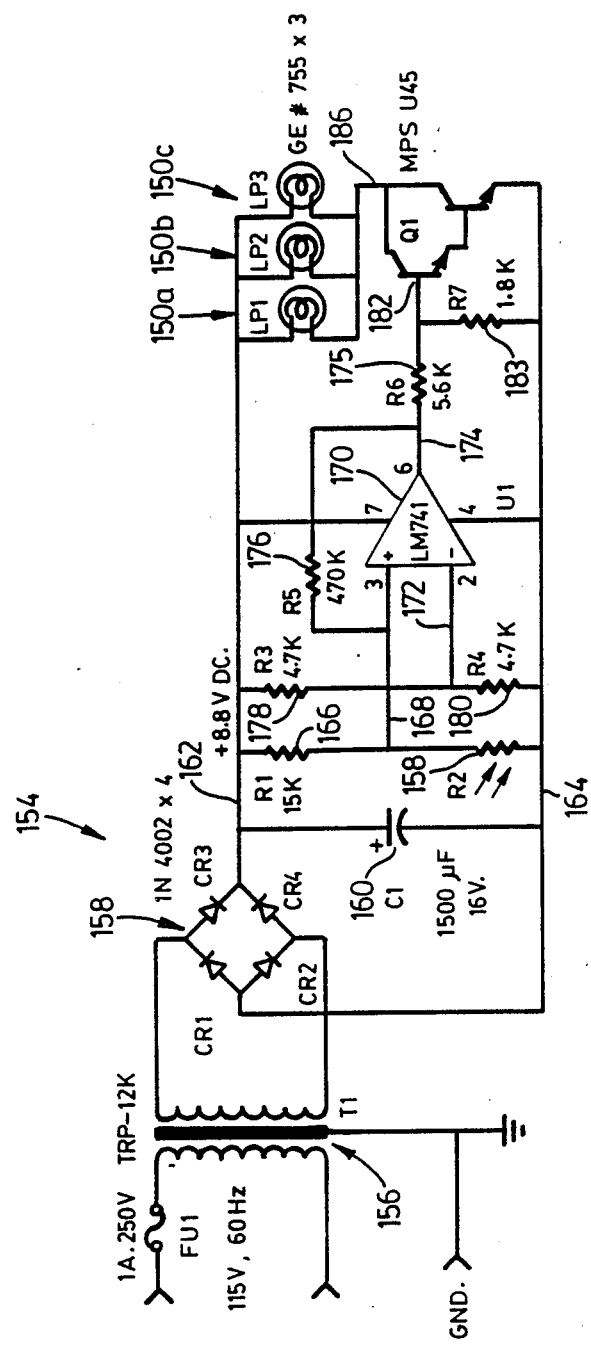
FIG. 5 is a schematic view of a portion of the house sign illustrated in FIG. 4.

In another embodiment as shown in FIGS. 4 and 5, an illuminated house sign 100 utilizes incandescent lighting in lieu of the fluorescent lighting as in the previous embodiment.

Referring to FIG. 4, the house sign 100 has a housing 112 and a front display panel 114, covering panel 128 and trim strip 118. The housing 112 is rectangular and has a rear wall 112a which is adjacent to an electrical supply box 130, a well known component commonly located in walls or ceilings to which light fixtures are attached.

The rear wall 112a has an aperture 112b through which extends electrical supply wire as shown at 132. The rear wall 112a also has apertures 112c and 112d for connection of the housing to the electrical supply box 130.

The electrical supply box 130 includes flanges 134, 136 to which are respectively coupled upper and lower bracket members 138, 140 by way of threaded fasteners 142. The lower bracket member 140 has a spanning portion 140a outwardly extending from a vertical facing portion 140b. The remote end of the spanning portion is downwardly oriented and of a dimension to extend through aperture 112c. The upper bracket member 138 has a spanning portion 138a outwardly extending from the facing portion 138b, and has located at its remote end, an aperture 138c to receive an assembly fastener 144.

The front of the housing 112 is defined by an opening which is bordered on its upper and lower sides by inwardly extending flanged portions 112e, 112f, which serve as abutments for a reflector 148 extending through the opening.

The reflector 148 has an outer concave reflective surface 148a and three centrally located apertures, one shown at 148b, through which extend three incandescent light bulbs 150. The light bulbs are in turn releasably held in fixtures 151 mounted on a main circuit board 152. The circuit board 152 contains switching circuitry, and a light sensor 156 which is mounted on a sub-circuit board 154 adjacent to the main circuit board 152 and through an aperture 112g in housing 112.

The control circuit 152 is shown in detail in FIG. 5 wherein power is received from a 115VAC 60 Hz source. The power is passed through step-down transformer 156 and a full bridge rectifier 158 to produce a positive direct current signal as in the previous embodiment. The rectified signal is further smoothed by a capacitor 160, having a capacitance of 1500 microfarads.

This signal is then passed through the circuit with 8.8 volts dc being registered between reference conductors 162 and 164 and subsequently passed through a voltage divider, which includes a resistor 166 in series with the cadmium sulfide photocell 158.

A tap conductor 168 is coupled with the voltage divider between resistor 166 and photocell 158 and forms the non-inverting input of an operational amplifier 170, which has an inverting input 172 and an output 174. The output 174 and the non-inverting input 168 are joined by a feedback resistor 176 having a resistance of 470k ohm. Coupled to the inverting input 172 is a voltage divider formed by a pair of resistors 178, 180, both of which have a resistence of 4.7k ohm so as to provide a fixed voltage of 4.4 volts at the inverting input 172.

In this manner, the operational amplifier 170 issues a signal on output 174, when the voltage on the non-inverting input 168 exceeds the voltage on inverting input 172, namely 4.4 volts.

Joined to the output 174 is a series resistor 175 which is joined to a Darlington driver transistor 182 and a bias resistor 183. The collector of driver transistor 182 is coupled to a conductor 186 which forms the terminal conductors for the three incandescent lights 150a, 150b and 150c.

In operation, the control circuit 154 monitors the ambient light intensity by switching on the incandescent lights 150a, 150b, 150c when the light intensity falls below a predetermined threshold level. As the light intensity falls, the resistence in photocell 158 increases beyond the value of resistor 166, namely 15k ohm. As the resistance of photocell 158 increases, so does the voltage there-across and accordingly the voltage on non-inverting input 168. When the resistance of the photocell 158 reached 15k ohm, the voltage on non-inverting input 168 equals the voltage on inverting input 172, namely 4.4 volts.

Upon the increase of the non-inverting input voltage beyond 4.4 volts, a signal is registered on the output 174, the magnitude of the signal being dependent on the gain of the amplifier 170, which in turn is governed by the value of feedback resistor 176.

The signal on output 174 is received by the base of the driver transistor 182 via resistor 175, thereby causing the same to be activated and thereby closing the circuit of the incandescent lights 150a, 150b, 150c. The circuit remains closed until the light intensity of the surroundings increases, thereby causing the voltage on non-inverting terminal of amplier 170 to fall below 4.4 volts, thereby opening the circuit.

Advantages of the invention are that there is no user requirement to attend to the switching on and off of the circuitry, and all of the components are standard off-the-shelf items thereby resulting in an inexpensive device. The electrical circuitry is compatable with existing domestic mains power supplies so that it can be readily obtained and installed by a user as required.

I claim:

1. An illuminated house sign comprising:
   a housing having top and bottom walls, a pair of side walls and front and back walls, said back wall having a first aperture for the passage therethrough of electrical source wires, said back wall having a second aperture in the lower region thereof for the insertion of a mounting prong, said mounting prong extending outwardly from a fixture box, said top wall having an aperture formed therein for engagement with a releasable bracket means extending from said fixture box and, a translucent surface forming part of said front wall, the translucent surface having indicia thereon to identify the house, an energizable light source located within said housing, control circuit means associated with said housing and receiving said electrical source wires for regulating the supply of electrical power from an electrical power source to the light source, photosensor means associated with the housing and being coupled to said control circuit, said photosensor means being responsive to a change in ambient light and constituting means effective to control the supply of electrical power to the light source in accordance with a predetermined ambient light level.

2. An illuminated house sign as claimed in claim 1 wherein said energizable light source is a fluorescent tube.

3. An illuminated house sign as claimed in claim 1 wherein said photosensor means is a cadmium sulphide variable resistance photocell.

4. An illuminated house sign as claimed in claim 1 wherein said house sign is adapted to be driven from a domestic electrical AC power supply, said control circuit including rectifying means for converting the AC power received from said AC power supply to DC power.

5. An illuminated house sign as claimed in claim 1 wherein said photosensor means is located in the base of the housing and its location constitutes means effective to permit said photosensor means to be responsive to ambient light.

6. An illuminated house sign as claimed in claim 1 wherein said light source is at least one incandescent light.

7. An illuminated house sign as claimed in claim 6 wherein said photosensor is a cadmium sulphide variable resistance photocell, and said control circuit includes a first potential divider means formed from a resistor having a constant predetermined resistance, and said photocell, said first potential divider having a voltage tap on which the voltage varies with said change in ambient light.

8. An illuminated house sign as claimed in claim 7 wherein said control circuit further includes comparison means having a pair of inputs and an output, the first of said inputs being coupled to said tap of said first potential divider, the second of said inputs being coupled to the tap of a second potential divider formed from a pair of resistors having a constant resistance, wherein said comparison means issues a signal on said output upon the occurrence of a voltage on said first input of a magnitude higher than the voltage on said second input.

9. An illuminated house sign as claimed in claim 8 wherein said control circuit further includes switching means to energize said incandescent light upon issuance of said signal on said output.

10. An illuminated house sign as claimed in claim 6 wherein said housing includes upper and lower flanges extending downwardly and upwardly respectively from said top and bottom walls and at the front edge thereof, said flanges serving as abutments for a reflector plate of a generally concave shape extending into the cavity defined by the walls of said housing, said reflector plate including an aperture for each of said at least one incandescent light.

11. An illuminated house sign comprising a generally rectangular box-like housing having a back, top, bottom and side walls defining a chamber with an opening opposite the back wall, a panel with translucent indicia thereon to identify the house, means for securing the panel over the opening for defining a face of the housing, bracket means mounted within said housing and having a surface for separating the chamber into chamber portions, said surface of the bracket means supporting contacts for receiving a fluorescent tube in one chamber portion, the other chamber portion having fluorescent tube control circuitry, a photosensor being located in the base of the housing and being electrically coupled to the control circuitry, the control circuitry being drivable by a rectified AC power supply to energize said fluorescent tube, the photosensor being responsive to ambient light and constituting means effective to control the supply of electrical power to the fluorescent tube in accordance with a predetermined ambient light level.

12. An illuminated house sign as claimed in claim 11 wherein the photosensor means is a cadmium sulphide variable resistance photocell, the photocell having a relatively high resistance in low ambient light conditions and a relatively low resistance in high ambient light conditions.

13. An illuminated light source as claimed in claim 11 wherein said control circuitry is mounted on a printed circuit board, located in a chamber portion beneath said surface.

* * * * *